US010621259B2

(12) United States Patent
Li

(10) Patent No.: US 10,621,259 B2
(45) Date of Patent: Apr. 14, 2020

(54) URL ERROR-CORRECTING METHOD, SERVER, TERMINAL AND SYSTEM

(71) Applicant: TENCENT TECHNOLOGY (SHENZHEN) COMPANY LIMITED, Shenzhen, Guangdong (CN)

(72) Inventor: Yonghua Li, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 679 days.

(21) Appl. No.: 15/202,964

(22) Filed: Jul. 6, 2016

(65) Prior Publication Data

US 2016/0364495 A1 Dec. 15, 2016

Related U.S. Application Data

(63) Continuation of application No. PCT/CN2015/081254, filed on Jun. 11, 2015.

(30) Foreign Application Priority Data

Jun. 11, 2014 (CN) .......................... 2014 1 0258946

(51) Int. Cl.
*G06F 16/2458* (2019.01)
*G06F 16/955* (2019.01)
*H04L 29/08* (2006.01)

(52) U.S. Cl.
CPC ...... *G06F 16/9566* (2019.01); *G06F 16/2458* (2019.01); *H04L 67/02* (2013.01)

(58) Field of Classification Search
CPC ..................... G06F 17/30533; G06F 17/30887
See application file for complete search history.

(56) References Cited

U.S. PATENT DOCUMENTS 6,078,866 A 6/2000 Buck et al.
6,092,100 A * 7/2000 Berstis .............. G06F 17/30887 707/E17.115

(Continued)

FOREIGN PATENT DOCUMENTS

CN 1936896 A 3/2007
CN 101477540 A 7/2009

(Continued)

OTHER PUBLICATIONS

Office Action dated Oct. 9, 2017 for Chinese application No. 201410258946.8, 23 pages.

(Continued)

*Primary Examiner* — Kris E Mackes
(74) *Attorney, Agent, or Firm* — Anova Law Group, PLLC

(57) ABSTRACT

In a URL error-correcting method, after a URL is received from a terminal, a server determines whether a web page corresponding to the URL exists. When there is no web page corresponding to the URL, the server determines that the URL is an incorrect URL. Similarity matching is performed using the URL with a URL in a URL database, to acquire a pre-determined quantity of URLs that are most similar to the URL, as alternative error-corrected URLs. The error-corrected URLs are sent to the terminal. The correctness of a URL is determined by means of determining whether a web page corresponding to the URL exists. When the URL is incorrect, similarity matching is performed with a URL in a URL database to obtain URLs possibly needed by a user, so as to achieve error correction of a URL.

14 Claims, 6 Drawing Sheets

(56) References Cited

U.S. PATENT DOCUMENTS

| | | | | |
|---|---|---|---|---|
| 7,325,045 | B1 * | 1/2008 | Manber | G06F 11/0709 707/E17.115 |
| 7,499,940 | B1 * | 3/2009 | Gibbs | G06F 17/30887 |
| 7,853,719 | B1 * | 12/2010 | Cao | G06F 17/30887 709/203 |
| 7,966,310 | B2 * | 6/2011 | Sullivan | G06F 17/30887 707/709 |
| 8,489,560 | B1 * | 7/2013 | Conroy | G06F 17/30864 705/14.54 |
| 8,631,097 | B1 * | 1/2014 | Seo | G06F 16/9577 709/219 |
| 2003/0046340 | A1 | 3/2003 | Kung | |
| 2004/0019697 | A1 * | 1/2004 | Rose | G06F 17/30887 709/245 |
| 2010/0131588 | A1 * | 5/2010 | Loftus | G06F 17/30899 709/203 |
| 2016/0292228 | A1 | 10/2016 | Liu | |

FOREIGN PATENT DOCUMENTS

| | | | |
|---|---|---|---|
| CN | 102456063 | A | 5/2012 |
| CN | 102915313 | A | 2/2013 |
| CN | 103414734 | A | 11/2013 |
| CN | 103455594 | A | 12/2013 |
| CN | 103812906 | A | 5/2014 |
| JP | 2003512775 | A | 4/2003 |
| WO | WO 01/30043 | A2 | 4/2001 |

OTHER PUBLICATIONS

International Search Report received in PCT Application No. PCT/CN2015/081254, dated Sep. 11, 2015 (4 pages).

Written Opinion of the International Searching Authority received in PCT Application No. PCT/CN2015/081254, dated Sep. 11, 2015 (4 pages).

* cited by examiner

URL ERROR-CORRECTING METHOD, SERVER, TERMINAL AND SYSTEM

CROSS-REFERENCE TO RELATED APPLICATIONS

This application is a continuation of International Application No. PCT/CN2015/081254, filed on Jun. 11, 2015, which claims priority to Chinese Patent Application No. 201410258946.8, filed on Jun. 11, 2014, both of which are hereby incorporated by reference in their entireties.

FIELD OF THE TECHNOLOGY

The present disclosure relates to the field of communications technologies, and in particular, to a URL error-correcting method, server, terminal and system.

BACKGROUND OF THE DISCLOSURE

A browser is a type of software that displays files on a web page server, and allows a user to interact with these files. The browser displays a text, an image and other information within a web page mainly by means of interacting with a web page server through a hypertext transfer protocol (HTTP) and accessing a web page. When a user enters a uniform resource locator (URL) into a URL bar of a browser, the browser may automatically display to the user a web page on the Internet that corresponds to the URL. Each web page on the Internet has a unique URL, and each URL needs to conform to certain format specification. A user can access the web page according to a URL that corresponds to the web page. It can be seen that, a user needs to memorize URLs of different web pages. As long as the URL has a slight character input error, or is not completely entered, the browser may fail to display a web page needed by a user.

With constant popularization of smart phones, more mobile phone users use a mobile phone to acquire and retrieve information. During the process of use, a website address of interest may be manually entered, to browse a web page or save the web page into a mobile browser. Currently, a mobile browser has provided functions such as automatic completion of a URL postfix, and may prompt a user to select ".com", ".cn", ".net", and the like.

In addition, existing URL error-correcting solutions may provide a user with functions such as automatic case conversion. The functions have greatly helped a user rapidly complete entering a URL during an input process. However, the existing URL error-correcting solutions cannot perform error correction on a URL that has been entered by a user, and the user needs to perform self-checking and re-enter a correct URL, leading to low operation efficiency.

SUMMARY

Embodiments of the present disclosure provide a URL error-correcting method, server, terminal and system, which are used to achieve error correction of a URL input by a user, and improve operation efficiency of the user.

A URL error-correcting method includes:

determining, after receiving a URL from a terminal, whether a web page corresponding to the URL exists;

determining that the URL is an incorrect URL if there is no web page corresponding to the URL, and performing similarity matching by using the URL with a URL in a URL database, to obtain a pre-determined quantity of URLs that are most similar to the URL as error-corrected URLs; and sending the error-corrected URLs to the terminal.

A URL error-correcting method includes:

receiving by a terminal a URL entered into a URL bar, and sending the URL to a server;

receiving, if there is no web page corresponding to the URL, error-corrected URLs from the server, the error-corrected URLs being a pre-determined quantity of URLs most similar to the URL that are obtained through performing similarity matching by using the URL with a URL in a URL database; and displaying received error-corrected URLs.

A server includes:

a web page determining unit, configured to determine, after receiving a URL from a terminal, whether a web page corresponding to the URL exists;

a matching and error-correcting unit, configured to determine, if there is no web page corresponding to the URL as determined by the web page determining unit, that the URL is an incorrect URL, perform similarity matching by using the URL with a URL in a URL database, and acquire a pre-determined quantity of URLs most similar to the URL as error-corrected URLs; and an information sending unit, configured to send error-corrected URLs to the terminal.

A terminal includes:

an input receiving unit, configured to receive a URL entered into a URL bar;

a URL sending unit, configured to send a URL received by the input receiving unit to a server;

an information receiving unit, configured to receive, if there is no web page corresponding to the URL, error-corrected URLs from the server, the error-corrected URLs being a pre-determined quantity of URLs most similar to the URL that are obtained through performing similarity matching by using the URL with a URL in a URL database; and a display unit, configured to display received error-corrected URLs.

A URL error-correcting system includes a terminal and a server connected in a communication manner, the server being any one of servers provided by the embodiments of the present disclosure, the terminal being any one of terminals provided by the embodiments of the present disclosure.

From the above technical solutions, it can be shown that, the embodiments of the present disclosure have the following advantages: the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions and advantages of the present disclosure clearer, the following describes the present disclosure in further detail with reference to accompanying drawings. Apparently, the described embodiments are only some of the embodiments of the present disclosure rather than all of the embodiments. All other embodiments obtained by a person of ordinary skill in the art based on the embodiments of the present disclosure without creative efforts, shall fall within the protection scope of the present disclosure.

Figure 1:
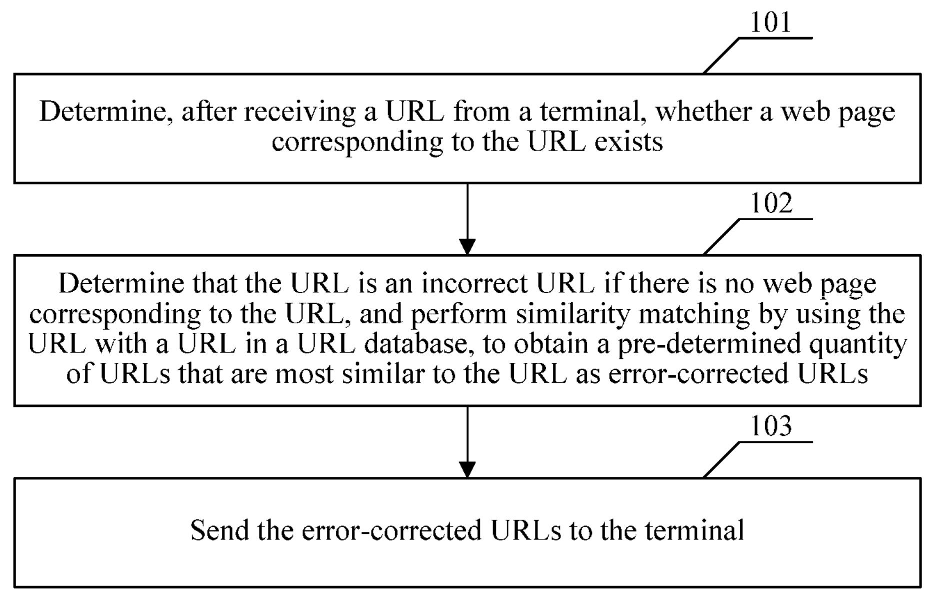
FIG. 1 is a schematic flowchart of a method according to an embodiment of the present disclosure.

An embodiment of the present disclosure provides a URL error-correcting method. As shown in FIG. 1, the method includes:

101: Determine, after receiving a URL from a terminal, whether a web page corresponding to the URL exists.

In this embodiment of the present disclosure, a server may receive a website address from a terminal, and the website address is generally represented in the form of a URL. The URL may be correct or incorrect. If the URL is correct, a web page can be opened normally, which is not described in details in this embodiment of the present disclosure. If the URL is incorrect, there may be no web page corresponding to the URL on a network side, and the network side may return information on failure to open a web page to the terminal, and cause the terminal to display the information. For the manner of determining by a server whether a web page corresponding to a URL exists, an embodiment of the present disclosure gives a specific example for detailed description. Specifically, the determining whether a web page corresponding to a URL exists includes:

acquiring return status of the URL, determining whether the return status of the URL is an error page, and determining, if the return status of the URL is an error page, that there is no web page corresponding to the URL.

102: Determine that the URL is an incorrect URL if there is no web page corresponding to the URL, and perform similarity matching by using the URL with a URL in a URL database, to obtain a pre-determined quantity of URLs that are most similar to the URL as error-corrected URLs.

103: Send the error-corrected URLs to the terminal.

In this embodiment of the present disclosure, the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

In addition to incorrectness of a keyword, incorrectness of a URL may also result from not matching the terminal type and consequently leading to failure to display a web page. For example, a web page specific to a personal computer cannot be opened on a mobile phone. Therefore, an embodiment of the present disclosure further provides a solution to solve non-matching of the terminal type and a URL, which is specifically described as follows: Further, prior to the performing similarity matching by using the URL with a URL in a URL database, the method further includes: acquiring the terminal type of the terminal; and the performing similarity matching by using the URL with a URL in a URL database includes:

performing similarity matching by using the URL with a URL in a URL database that corresponds to the terminal type.

During the process of similarity matching by a server, there may be a plurality of URLs similar to the incorrect URL. In addition, the quantity of error-corrected URLs in this embodiment of the present disclosure can also be freely set. As a result, the quantity of error-corrected URLs may be greater than or equal to 2. In such a case, it is necessary to predict a user's operation behaviors and sort error-corrected URLs, so that the user can more conveniently find a needed URL. A solution provided by an embodiment of the present disclosure is specifically described as follows: Further, if the quantity of error-corrected URLs is greater than or equal to 2, the method further includes:

acquiring access traffic of the error-corrected URLs; and sending the access traffic of the error-corrected URLs to the terminal, or sorting the access traffic of the error-corrected URLs in a descending sequence, and sending sequencing information of the error-corrected URLs to the terminal.

Access traffic is a parameter used for counting traffic of a website, including quantity of unique users, total quantity of users (including repeat visitors), quantity of web pages browsed, quantity of web pages browsed by each user, average dwell-time of a user on the website, and the like.

In addition to performing error correction on a URL input by a user, an embodiment of the present disclosure further prevents a user from inputting an incorrect URL from the source of user input, and improves efficiency of inputting a URL by a user, which is specifically described as follows: Further, prior to the receiving a URL from a terminal, the method further includes:

receiving input information from the terminal, the input information being a character string entered into a URL bar on the terminal;

performing matching in a URL database by using the character string as a keyword, and acquiring a set quantity of URLs that are ranked top in access traffic of URLs having the keyword as alternative URLs; and sending the alternative URLs to the terminal.

When entering a URL into a URL bar of a browser, a user gradually inputs the URL according to a character string. In this embodiment of the present disclosure, the character string is acquired on a server side and is used to perform prediction on URLs possibly needed by a user, and predicted alternative URLs are recommended for selection by a user, so that the user needs not to completely input a URL, and the possibility of error occurring in entering a long URL is reduced. Therefore, operation efficiency of a user can be improved.

Figure 2:
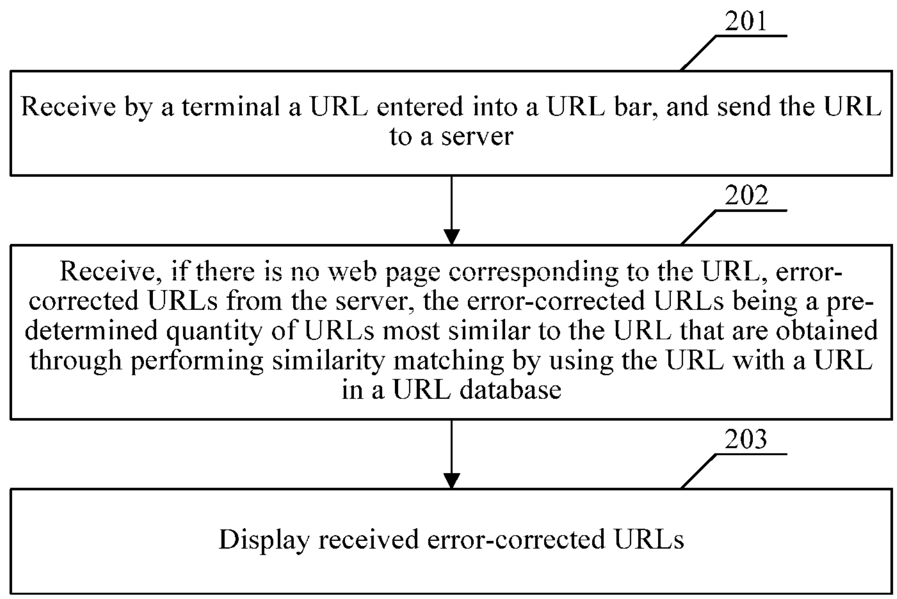
FIG. 2 is a schematic flowchart of a method according to an embodiment of the present disclosure.

An embodiment of the present disclosure further provides another URL error-correcting method. As shown in FIG. 2, the method includes:

201: Receive by a terminal a URL entered into a URL bar, and send the URL to a server.

In this embodiment of the present disclosure, a server may receive a website address from a terminal, and the website address is generally represented in the form of a URL. The URL may be correct or incorrect. If the URL is correct, a web page can be opened normally, which is not described in details in this embodiment of the present disclosure. If the URL is incorrect, there may be no web page corresponding to the URL on a network side, and the network side may return information on failure to open a web page to the terminal, and cause the terminal to display the information.

202: Receive, if there is no web page corresponding to the URL, error-corrected URLs from the server, the error-corrected URLs being a pre-determined quantity of URLs most similar to the URL that are obtained through performing similarity matching by using the URL with a URL in a URL database.

203: Display received error-corrected URLs.

In this embodiment of the present disclosure, the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

A technical problem to be solved in this embodiment of the present disclosure is how to perform error correction on a URL, which can be solved as long as a terminal receives a correct URL. After a terminal receives a correct URL, whether to select the correct URL and open a corresponding web page, is not necessary for solving the above technical problem. An embodiment of the present disclosure further provides a solution of further selecting error-corrected URLs and opening a corresponding web page by a user, which is specifically described as follows: Further, the method further includes:

receiving a URL selected from the error-corrected URLs, sending the URL selected from the error-corrected URLs to a server, and receiving web page data.

During the process of similarity matching by a server, there may be a plurality of URLs similar to the incorrect URL. In addition, the quantity of error-corrected URLs in this embodiment of the present disclosure can also be freely set. As a result, the quantity of error-corrected URLs may be greater than or equal to 2. In such a case, it is necessary to predict a user's operation behaviors and sort error-corrected URLs, so that the user can more conveniently find a needed URL. A solution provided by an embodiment of the present disclosure is specifically described as follows: If the quantity of error-corrected URLs is greater than or equal to 2, the method further includes:

receiving access traffic of the error-corrected URLs sent by the server, or receiving sequencing information of the error-corrected URLs sent by the server, the sequencing information of the error-corrected URLs carrying information on sorting access traffic of the error-corrected URLs in a descending sequence; and the displaying received error-corrected URLs includes: displaying the error-corrected URLs according to access traffic of the error-corrected URLs in a descending sequence; or displaying the error-corrected URLs according to an instruction of sequencing information of the error-corrected URLs.

In addition to performing error correction on a URL input by a user, an embodiment of the present disclosure further prevents a user from inputting an incorrect URL from the source of user input, and improves efficiency of inputting a URL by a user, which is specifically described as follows: prior to the receiving a URL entered into a URL bar, the method includes:

receiving input information entered into a URL bar, searching for a URL in a local database by using a character string included in the input information as a keyword, and displaying the URL that is found, the local database having URLs that have been accessed by the terminal stored therein.

In this embodiment, prediction on a URL to be input by a user can be performed on a terminal side, which is implemented rapidly and needs not to occupy network resource.

In addition to performing on a terminal side prediction on a URL to be input by a user, an embodiment of the present disclosure further prevents a user from inputting an incorrect URL from the source of user input with reference to the network resource, and improves efficiency of inputting a URL by a user, which is specifically described as follows: If the URL is not found, the method further includes:

sending the keyword to the server, and receiving alternative URLs returned by the server, the alternative URLs being a pre-determined quantity of URLs that are obtained through matching in a URL database by using the character string as a keyword and are ranked top in access traffic of URLs having the keyword; and displaying the received alternative URLs.

For the solution of predicting a URL with reference to network resource, as the quantity of URLs saved on a network side may greatly exceed the quantity of URLs that have been accessed, the prediction may be more comprehensive, and particularly, prediction on URLs that have not been accessed by a user may be achieved.

The following embodiment will describe specific implementation of this embodiment of the present disclosure in further details with reference to a specific example. In the following description of the example, a mobile phone is used as an example of a terminal.

In this embodiment of the present disclosure, URL detection may be performed on a URL input by a user on a server side. If a web page cannot be opened due to an error in the URL input by the user, or a web page opened is not a target page of the user, the server side may issue a URL list, to ask the user whether to open a corresponding page. In addition, the server side may perform a retrieve according to conditions of a mobile phone terminal used by the user, to determine whether there is a web page on the mobile phone side that can be accessed by the user, and if any, return the address of the web page on the mobile phone side to a client, and ask the user whether to re-link to the page on the mobile phone side.

As an example of an application scenario, the following describes the work process of this embodiment of the present disclosure:

1. A user enters a URL into a URL bar of a browser on a client, such as jd.vom.

2. As the URL input by the user is incorrect, a page of the browser will switch to an incorrect page.

3. A server side may detect that information received by the user is information on an error page, and therefore perform similarity matching by using "jd.vom" with URLs in a URL database to obtain error-corrected URLs, and send the error-corrected URLs carried in a URL list to the terminal.

4. The user selects a URL in the URL list and re-sends the URL to the server, the server returns a correct page to the terminal, and the terminal opens the correct page.

This technical solution provides a user with good user experience. When a user inputs an incorrect URL, a URL list for error correction may be rapidly provided for the user, so as to facilitate the user to rapidly open a web page. Troubles of a user and repeated operations of re-entering manually may be reduced. The solution improves user experience during use of a browser. For a product, the solution increases stickiness to a user, maintains a user's focus, and greatly promotes improvement of traffic of a browser.

Figure 3:
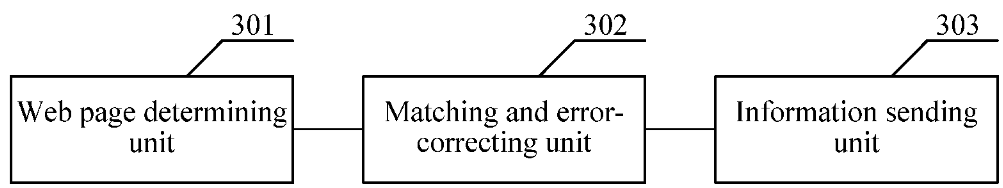
FIG. 3 is a schematic structural diagram of a server according to an embodiment of the present disclosure.

An embodiment of the present disclosure further provides a server. As shown in FIG. 3, the server includes:

a web page determining unit 301, configured to determine, after receiving a URL from a terminal, whether a web page corresponding to the URL exists;

a matching and error-correcting unit 302, configured to determine, if there is no web page corresponding to the URL as determined by the web page determining unit 301, that the URL is an incorrect URL, perform similarity matching by using the URL with a URL in a URL database, and acquire a pre-determined quantity of URLs most similar to the URL as error-corrected URLs; and an information sending unit 303, configured to send error-corrected URLs to the terminal.

In this embodiment of the present disclosure, the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

In this embodiment of the present disclosure, a server may receive a website address from a terminal, and the website address is generally represented in the form of a URL. The URL may be correct or incorrect. If the URL is correct, a web page can be opened normally, which is not described in details in this embodiment of the present disclosure. If the URL is incorrect, there may be no web page corresponding to the URL on a network side, and the network side may return information on failure to open a web page to the terminal, and cause the terminal to display the information. For the manner of determining by a server whether a web page corresponding to a URL exists, an embodiment of the present disclosure gives a specific example for detailed description, which is specifically described as follows. Optionally, the web page determining unit 301 is configured to acquire return status of the URL, determine whether the return status of the URL is an error page, and determine, if the return status of the URL is an error page, that there is no web page corresponding to the URL.

Figure 4:
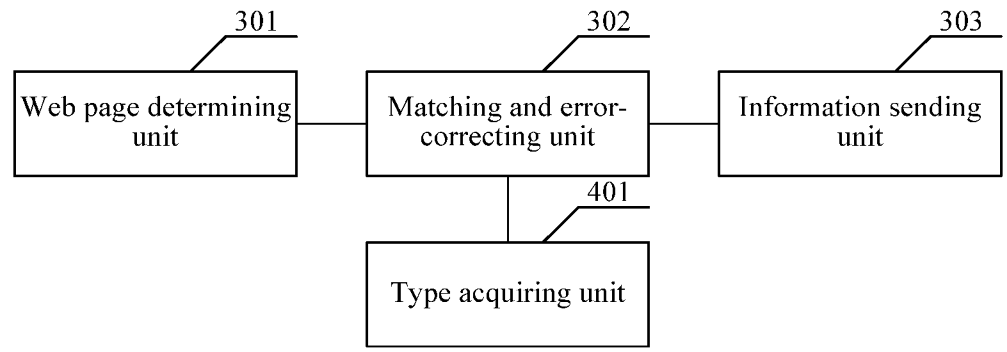
FIG. 4 is a schematic structural diagram of a server according to an embodiment of the present disclosure.

In addition to incorrectness of a keyword, incorrectness of a URL may also result from not matching the terminal type and consequently leading to failure to display a web page. For example, a web page specific to a personal computer cannot be opened on a mobile phone. Therefore, an embodiment of the present disclosure further provides a solution to solve non-matching of the terminal type and a URL, which is specifically described as follows. Further, as shown in FIG. 4, the server further includes:

a type acquiring unit 401, configured to acquire the terminal type of the terminal; and the matching and error-correcting unit 302, configured to perform similarity matching by using the URL with a URL in a URL database that corresponds to the terminal type.

Figure 5:
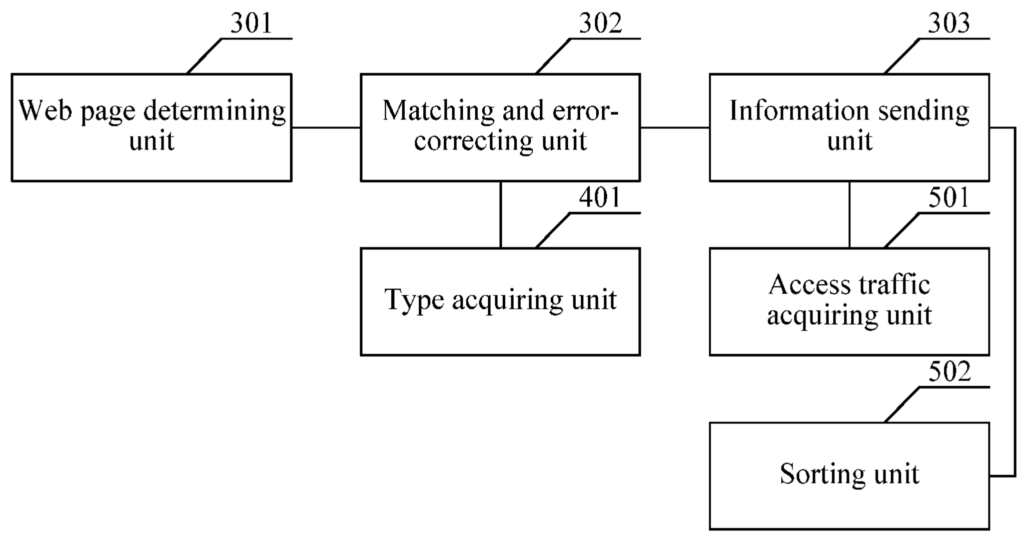
FIG. 5 is a schematic structural diagram of a server according to an embodiment of the present disclosure.

During the process of similarity matching by a server, there may be a plurality of URLs similar to the incorrect URL. In addition, the quantity of error-corrected URLs in this embodiment of the present disclosure can also be freely set. As a result, the quantity of error-corrected URLs may be greater than or equal to 2. In such a case, it is necessary to predict a user's operation behaviors and sort error-corrected URLs, so that the user can more conveniently find a needed URL. A solution provided by an embodiment of the present disclosure is specifically described as follows. Further, as shown in FIG. 5, the server further includes:

an access traffic acquiring unit 501, configured to acquire, if the quantity of error-corrected URLs is greater than or equal to 2, access traffic of the error-corrected URLs; and the information sending unit 303, further configured to send the access traffic of the error-corrected URLs to the terminal; or the server further includes:

a sorting unit 502, configured to sort access traffic of the error-corrected URLs acquired by the access traffic acquiring unit 501 in a descending sequence; and the information sending unit 303, configured to send sequencing information of the error-corrected URLs to the terminal.

Access traffic is a parameter used for counting traffic of a website, including quantity of unique users, total quantity of users (including repeat visitors), quantity of web pages browsed, quantity of web pages browsed by each user, average dwell-time of a user on the website, and the like.

Figure 6:
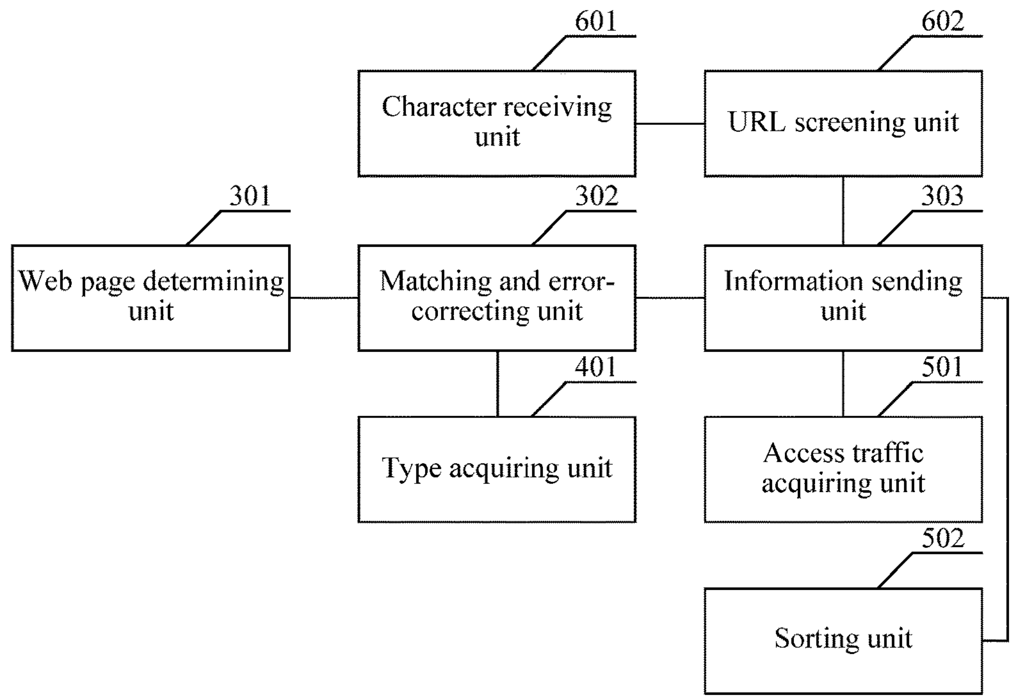
FIG. 6 is a schematic structural diagram of a server according to an embodiment of the present disclosure.

In addition to performing error correction on a URL input by a user, an embodiment of the present disclosure further prevents a user from inputting an incorrect URL from the source of user input, and improves efficiency of inputting a URL by a user, which is specifically described as follows. Further, as shown in FIG. 6, the server further includes:

a character receiving unit 601, configured to receive, prior to the receiving a URL from a terminal, input information from the terminal, the input information being a character string entered into a URL bar on the terminal;

a URL screening unit 602, configured to perform matching in a URL database by using the character string as a keyword, and acquire a set quantity of URLs that are ranked top in access traffic of URLs having the keyword as alternative URLs; and the information sending unit 303, further configured to send the alternative URLs to the terminal.

When entering a URL into a URL bar of a browser, a user gradually inputs the URL according to a character string. In this embodiment of the present disclosure, the character string is acquired on a server side and is used to perform prediction on URLs possibly needed by a user, and predicted alternative URLs are recommended for selection by a user, so that the user needs not to completely input a URL, and the possibility of error occurring in entering a long URL is reduced. Therefore, operation efficiency of a user can be improved.

Figure 7:
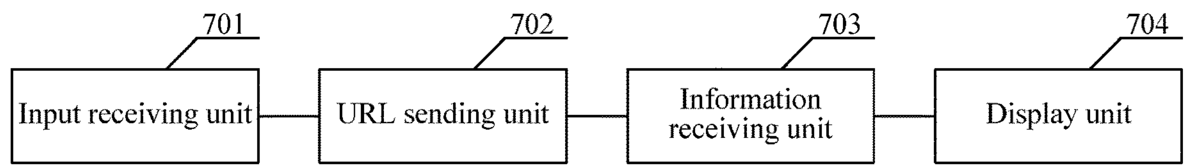
FIG. 7 is a schematic structural diagram of a terminal according to an embodiment of the present disclosure.

An embodiment of the present disclosure further provides a terminal. As shown in FIG. 7, the terminal includes:

an input receiving unit 701, configured to receive a URL entered into a URL bar;

a URL sending unit 702, configured to send a URL received by the input receiving unit 701 to a server;

an information receiving unit 703, configured to receive, if there is no web page corresponding to the URL, error-corrected URLs from the server, the error-corrected URLs being a pre-determined quantity of URLs most similar to the URL that are obtained through performing similarity matching by using the URL with a URL in a URL database; and a display unit 704, configured to display received error-corrected URLs.

In this embodiment of the present disclosure, a server may receive a website address from a terminal, and the website address is generally represented in the form of a URL. The URL may be correct or incorrect. If the URL is correct, a web page can be opened normally, which is not described in details in this embodiment of the present disclosure. If the URL is incorrect, there may be no web page corresponding to the URL on a network side, and the network side may return information on failure to open a web page to the terminal, and cause the terminal to display the information.

In this embodiment of the present disclosure, the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

A technical problem to be solved in this embodiment of the present disclosure is how to perform error correction on a URL, which can be solved as long as a terminal receives a correct URL. After a terminal receives a correct URL, whether to select the correct URL and open a corresponding web page, is not necessary for solving the above technical problem. An embodiment of the present disclosure further provides a solution of further selecting error-corrected URLs and opening a corresponding web page by a user, which is specifically described as follows: Further, the input receiving unit 701 is further configured to receive a URL selected from the error-corrected URLs;

the URL sending unit 702 is further configured to send a URL selected from the error-corrected URLs to a server; and the information receiving unit 703 is further configured to receive web page data.

During the process of similarity matching by a server, there may be a plurality of URLs similar to the incorrect URL. In addition, the quantity of error-corrected URLs in this embodiment of the present disclosure can also be freely set. As a result, the quantity of error-corrected URLs may be greater than or equal to 2. In such a case, it is necessary to predict a user's operation behaviors and sort error-corrected URLs, so that the user can more conveniently find a needed URL. A solution provided by an embodiment of the present disclosure is specifically described as follows: Further, the information receiving unit 703 is further configured to receive, if the quantity of the error-corrected URLs is greater than or equal to 2, access traffic of the error-corrected URLs sent by the server, or receive sequencing information of the error-corrected URLs sent by the server, the sequencing information carrying information on sorting access traffic of the error-corrected URLs in a descending sequence; and the display unit 704 is configured to display the error-corrected URLs according to access traffic of the error-corrected URLs in a descending sequence; or display the error-corrected URLs according to an instruction of sequencing information of the error-corrected URLs.

Figure 8:
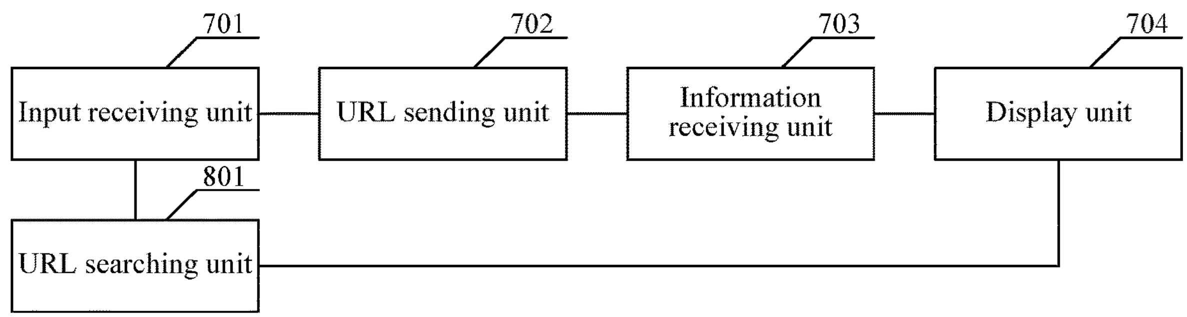
FIG. 8 is a schematic structural diagram of a terminal according to an embodiment of the present disclosure.

In addition to performing error correction on a URL input by a user, an embodiment of the present disclosure further prevents a user from inputting an incorrect URL from the source of user input, and improves efficiency of inputting a URL by a user, which is specifically described as follows: Further, as shown in FIG. 8, the input receiving unit 701 is further configured to receive, prior to the receiving a URL entered into a URL bar, input information entered into the URL bar; the terminal further includes:

a URL searching unit 801, configured to search for a URL in a local database by using a character string included in the input information as a keyword, the local database having URLs that have been accessed by the terminal stored therein; and the display unit 704, further configured to display a URL found by the URL searching unit 801.

In this embodiment, prediction on a URL to be input by a user can be performed on a terminal side, which is implemented rapidly and needs not to occupy network resource.

Figure 9:
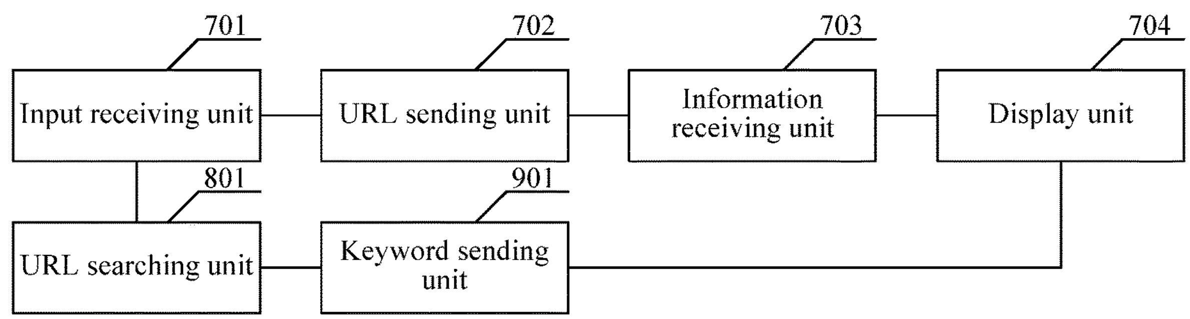
FIG. 9 is a schematic structural diagram of a terminal according to an embodiment of the present disclosure.

In addition to performing on a terminal side prediction on a URL to be input by a user, an embodiment of the present disclosure further prevents a user from inputting an incorrect URL from the source of user input with reference to the network resource, and improves efficiency of inputting a URL by a user, which is specifically described as follows. Further, as shown in FIG. 9, the terminal further includes:

a keyword sending unit 901, configured to send the keyword to the server if the URL searching unit 801 has not found the URL;

the information receiving unit 703, further configured to receive alternative URLs returned by the server, the alternative URLs being a set quantity of URLs that are obtained through performing matching in a URL database by using the character string as a keyword and ranked top in access traffic of URLs having the keyword; and the display unit 704, further configured to display alternative URLs received by the information receiving unit.

For the solution of predicting a URL with reference to network resource, as the quantity of URLs saved on a network side may greatly exceed the quantity of URLs that have been accessed, the prediction may be more comprehensive, and particularly, prediction on URLs that have not been accessed by a user may be achieved.

Figure 10:
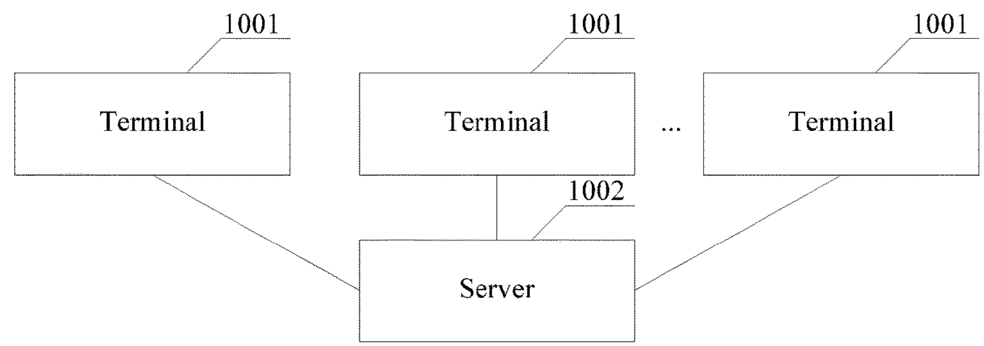
FIG. 10 is a schematic structural diagram of a URL error-correcting system according to an embodiment of the present disclosure.

An embodiment of the present disclosure further provides a URL error-correcting system. As shown in FIG. 10, the system includes a terminal 1001 and a server 1002 connected in a communication manner, the server 1002 being any one of servers 1002 provided by the embodiments of the present disclosure, the terminal 1001 being any one of terminals 1001 provided by the embodiments of the present disclosure.

In the above embodiment as shown in FIG. 10, the quantity of terminals shown is 3, and actually, the quantity of terminals may be any integer greater than or equal to 1. FIG. 10 is only used for schematic purposes, and it shall not be considered that the quantity of terminals and servers shown in FIG. 10 is a limitation to this embodiment of the present disclosure.

In this embodiment of the present disclosure, the correctness of a URL is determined by means of determining whether a web page corresponding to the URL exists, and in case that the URL is incorrect, similarity matching is performed with a URL in a URL database to obtain URLs possibly needed by a user, so as to achieve error correction of a URL. The user needs not to perform self-checking and re-enter a correct URL, nor to accurately memorize a correct URL, thereby improving operation efficiency of the user.

Figure 11:
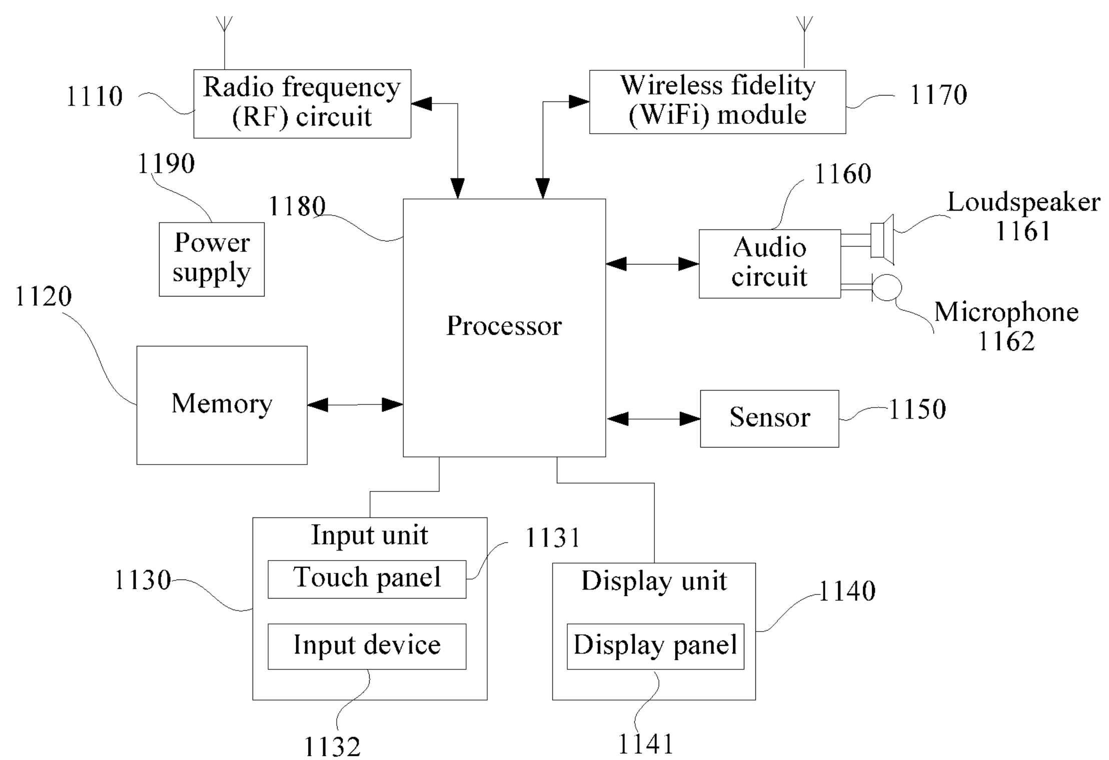
FIG. 11 is a schematic structural diagram of a terminal according to an embodiment of the present disclosure.

An embodiment of the present disclosure further provides another terminal, as shown in FIG. 11. For the convenience of description, only a part related to this embodiment of the present disclosure is shown. For specific technical details not disclosed, refer to the method embodiments of the present disclosure. The terminal may be any terminal device, including a mobile phone, a tablet computer, a personal digital assistant (PDA), a Point of Sales (POS) terminal, a vehicle-mounted computer, and the like. A mobile phone is used as an example of the terminal.

FIG. 11 shows a block diagram of the structure of a part of a mobile phone related to a terminal according to this embodiment of the present disclosure. Referring to FIG. 11, the mobile phone includes: a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that the structure of the mobile phone shown in FIG. 11 does not constitute a limitation to the mobile phone, and the mobile phone may include more components or fewer components than those shown in the figure, or some components may be combined, or a different component deployment may be used.

The following specifically describes the components of the mobile phone with reference to FIG. 11.

The RF circuit 1110 may be configured to receive and send signals during an information receiving and sending process, or a call process. Particularly, the RF circuit 1110 receives downlink information from a base station, then delivers the information to the processor 1180 for processing, and sends related uplink data to the base station. Generally, the RF circuit 1110 includes but is not limited to an antenna, at least one amplifier, a transceiver, a coupler, a low noise amplifier (LNA), and a duplexer. In addition, the RF circuit 1110 may also communicate with a network and another device by wireless communications. The wireless communications may use any communications standard or protocol, which includes but is not limited to: Global System of Mobile Communication (GSM), General Packet Radio Service (GPRS), Code Division Multiple Access (CDMA), Wideband Code Division Multiple Access (WCDMA), Long Term Evolution (LTE), Email, Short Messaging Service (SMS), and the like.

The memory 1120 may be configured to store a software program and module. The processor 1180 runs the software program and module stored in the memory 1120, to implement various functional applications and data processing of the mobile phone. The memory 1120 may mainly include a program storage area and a data storage area. The program storage area may store an operating system, an application program required by at least one function (such as a sound playback function, and an image display function), and the like. The data storage area may store data (such as audio data, and an address book) created according to use of the mobile phone, and the like. In addition, the memory 1120 may include a high speed random access memory, and may also include a non-volatile memory such as at least one magnetic disk storage device, a flash memory, or another volatile solid-state storage device.

The input unit 1130 may be configured to receive input digit or character information, and generate a keyboard signal input related to the user setting and function control of the mobile phone. Specifically, the input unit 1130 may include a touch panel 1131 and another input device 1132. The touch panel 1131, which may also be referred to as a touch screen, may be configured to collect a touch operation of a user on or near the touch panel (such as an operation of a user on or near the touch panel 1131 by using any suitable object or accessory, such as a finger or a stylus), and drive a corresponding connection apparatus according to a preset program. Optionally, the touch panel 1131 may include two parts: a touch detection apparatus and a touch controller. The touch detection apparatus detects the touch position of a user, detects a signal generated by the touch operation, and transmits the signal to the touch controller. The touch controller receives the touch information from the touch detection apparatus, converts the signal into touch point coordinates, and sends the touch point coordinates to the processor 1180. Moreover, the touch controller may receive and execute a command sent from the processor 1180. In addition, the touch panel 1131 may be a resistive, capacitive, infrared, or surface sound wave type touch panel. In addition to the touch panel 1131, the input unit 1130 may further include the another input device 1132. Specifically, the another input device 1132 may include, but is not limited to, one or more of a physical keyboard, a functional key (such as a volume control key and a switch key), a track ball, a mouse, and a joystick.

The display unit 1140 may be configured to display information input by a user, or information provided for a user, and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1131 transmits the touch operation to the processor 1180, so as to determine the type of the touch event. Then, the processor 1180 provides a corresponding visual output on the display panel 1141 according to the type of the touch event. Although in FIG. 11, the touch panel 1131 and the display panel 1141 are used as two separate components to implement input and output functions of the mobile phone, in some embodiments, the touch panel 1131 and the display panel 1141 may be integrated to implement the input and output functions of the mobile phone.

The mobile phone may further include at least one sensor 1150, for example, an optical sensor, a motion sensor, and other sensors. Specifically, the optical sensor may include an ambient light sensor and a proximity sensor. The ambient light sensor may adjust luminance of the display panel 1141 according to brightness of the ambient light. The proximity sensor may switch off the display panel 1141 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 1160, a loudspeaker 1161, and a microphone 1162 may provide audio interfaces between the user and the mobile phone. The audio circuit 1160 may convert received audio data into an electric signal and transmit the electric signal to the loudspeaker 1161. The loudspeaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 1180 for processing. Then, the processor 1180 sends the audio data to, for example, another mobile phone by using the RF circuit 1110, or outputs the audio data to the memory 1120 for further processing.

WiFi belongs to a short distance wireless transmission technology. The mobile phone may help, by using the WiFi module 1170, a user to receive and send e-mails, browse a web page, access streaming media, and so on, which provides wireless broadband Internet access for the user. Although FIG. 11 shows the WiFi module 1170, it may be understood that the WiFi module is not a necessary component of the mobile phone, and when required, the WiFi module may be omitted as long as the scope of the essence of the present disclosure is not changed.

The processor 1180 is the control center of the mobile phone, and is connected to various parts of the mobile phone by using various interfaces and lines. By running or executing the software program and/or module stored in the memory 1120, and invoking data stored in the memory 1120, the processor 1180 performs various functions and data processing of the mobile phone, thereby performing overall monitoring on the mobile phone. Optionally, the processor 1180 may include one or more processing units. Preferably, the processor 1180 may integrate an application processor and a modem. The application processor mainly processes an operating system, a user interface, an application program, and the like. The modem mainly processes wireless communications. It may be understood that the foregoing modem may also not be integrated into the processor 1180.

The mobile phone further includes the power supply 1190 (such as a battery) for supplying power to the components. Preferably, the power supply may be logically connected to the processor 1180 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present disclosure, the processor 1180 included in the terminal further has a function of controlling the terminal to execute the method process that is executed by a terminal in the foregoing method.

Figure 12:
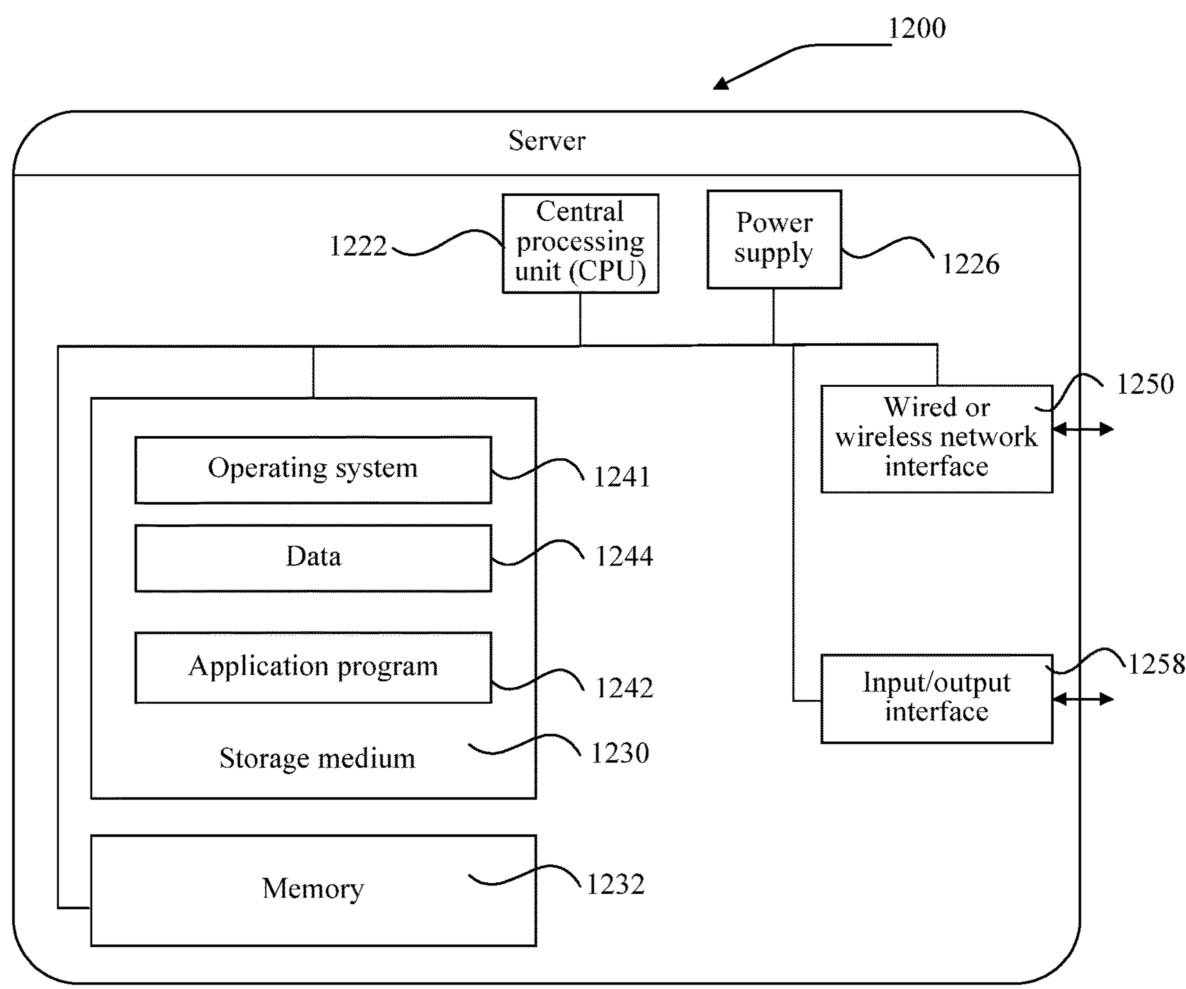
FIG. 12 is a schematic structural diagram of a server according to an embodiment of the present disclosure.

FIG. 12 is a schematic structural diagram of a server according to an embodiment of the present disclosure. A server 1200 may vary greatly with different configuration or performance, and may include one or more central processing units (CPU) 1222 (for example, one or more processors), a memory 1232, and one or more storage media 1230 (for example, one or more mass storage devices) for storing an application program 1242 or data 1244. The memory 1232 and the storage media 1230 may provide temporary or permanent storage. A program stored in the storage media 1230 may include one or more modules (not shown in the figure), and each module may include a series of instruction operations on the server. Further, the central processing units 1222 may be configured to communicate with the storage media 1230, and perform on the server 1200 a series of instruction operations stored in the storage media 1230.

The server 1200 may further include one or more power supplies 1226, one or more wired or wireless network interfaces 1250, one or more input/output interfaces 1258, and/or one or more operating systems 1241, for example, Windows Server™, Mac OS X™, Unix™, Linux™, FreeBSD™ and the like.

In the foregoing embodiments, steps executed by the server may be based on the structure of a server as shown in FIG. 12.

It should be noted that, in the foregoing terminal and server embodiments, the included units are only divided on basis of logical functions. However, the division of the units is not restricted thereto as long as a corresponding function can be implemented. In addition, specific names of the functional units are also merely used for differentiation from each other, but are not intended to limit the protection scope of the present disclosure.

In addition, a person of ordinary skill in the art may understand that, all or some of the steps in the foregoing method embodiments may be implemented by a program instructing relevant hardware, and the program may be stored in a computer-readable storage medium. The storage medium may be a read-only memory, a magnetic disk, an optical disc or the like.

The above descriptions only show preferred specific implementation manners of the present disclosure, but are not intended to limit the protection scope of the present disclosure. Any change or replacement easily obtained by a person skilled in the art within the technical scope disclosed in the embodiments of the present disclosure shall fall within the protection scope of the present disclosure. Therefore, the protection scope of the present disclosure shall be subject to the protection scope of the claims.

What is claimed is:

1. A URL error-correcting method, comprising:

determining, by a server, after receiving a URL from a terminal, whether a web page corresponding to the URL exists;

determining, by the server, that the URL is an incorrect URL if there is no web page corresponding to the URL;

performing, by the server, similarity matching using the URL with URLs in a URL database, to obtain a pre-determined quantity of URLs that are most similar to the URL as error-corrected URLs;

sending, by the server, the error-corrected URLs to the terminal;

in response to determining that the terminal is a mobile phone, determining whether a page at one of the error-corrected URLs has a corresponding page accessible for mobile phone terminals, the page at the one of the error-corrected URLs being accessible for personal computer terminals; and providing an additional option for a user of the terminal about whether to re-link the web page to the page corresponding to the mobile phone terminals;

wherein prior to receiving the URL from the terminal, the method further comprises:

receiving, by the server, a character string from the terminal input by a user before the user completely input the URL into a URL bar of the terminal, searching, by the server, a URL database using the character string as a keyword to acquire a plurality of URLs, sorting the plurality of URLs from high to low based on access traffic of the plurality of URLs, wherein the access traffic comprises at least one of: a quantity of unique users, a total quantity of users, a quantity of web pages browsed, a quantity of web pages browsed by each user, or an average dwell-time of a user, acquiring, by the server, a set quantity of URLs that are ranked top in the sorted plurality of URLs as alternative URLs, and sending, by the server, the alternative URLs to the terminal for selection by the user.

2. The method according to claim 1, wherein the determining, by the server, whether a web page corresponding to the URL exists comprises:

acquiring return status of the URL, determining whether the return status of the URL is an error page, and determining, when the return status of the URL is an error page, that there is no web page corresponding to the URL.

3. The method according to claim 1, wherein:

prior to the performing, by the server, the similarity matching using the URL with a URL in a URL database further comprises:

acquiring the terminal type of the terminal; and the performing similarity matching using the URL with a URL in a URL database comprises:

performing similarity matching using the URL with a URL in a URL database that corresponds to the terminal type.

4. The method according to claim 1, wherein when the quantity of error-corrected URLs is greater than or equal to two, the method further comprises:

acquiring access traffic of the error-corrected URLs; and sending the access traffic of the error-corrected URLs to the terminal, or sorting the access traffic of the error-corrected URLs in a descending sequence and sending sequencing information of the error-corrected URLs to the terminal.

5. A URL error-correcting method, comprising:

receiving by a terminal a URL entered into a URL bar, and sending the URL to a server;

receiving, by the terminal, when there is no web page corresponding to the URL, error-corrected URLs from the server, the error-corrected URLs being a pre-determined quantity of URLs most similar to the URL that are obtained through performing similarity matching using the URL with URLs in a URL database;

displaying, by the terminal, the received error-corrected URLs, wherein the server determines, in response to the terminal being a mobile phone, whether a page at one of the error-corrected URLs has a corresponding page accessible for mobile phone terminals, the page at the one of the error-corrected URLs being accessible for personal computer terminals; and providing an additional option for a user of the terminal about whether to re-link the web page to the page corresponding to the mobile phone terminals;

wherein prior to sending the URL to the server, the method further comprises:

sending, by the terminal before a user completely input the URL into a URL bar of the terminal, a character string input by the user to the server, so that the server searches a URL database using the character string as a keyword to acquire a plurality of URLs, sorts the plurality of URLs from high to low based on access traffic of the plurality of URLs and acquires a set quantity of URLs that are ranked top in the sorted plurality of URLs as alternative URLs, wherein the access traffic comprises at least one of: a quantity of unique users, a total quantity of users, a quantity of web pages browsed, a quantity of web pages browsed by each user, or an average dwell-time of a user, receiving, by the terminal, the alternative URLs from the server for selection by the user.

6. The method according to claim 5, further comprising:

receiving a URL selected from the error-corrected URLs, sending the URL selected from the error-corrected URLs to a server, and receiving web page data.

7. The method according to claim 5, wherein when the quantity of the error-corrected URLs is greater than or equal to two, the method further comprises:

receiving access traffic of the error-corrected URLs sent by the server, or receiving sequencing information of the error-corrected URLs sent by the server, the sequencing information of the error-corrected URLs carrying information on sorting access traffic of the error-corrected URLs in a descending sequence; and the displaying received error-corrected URLs comprises:

displaying the error-corrected URLs according to access traffic of the error-corrected URLs in a descending sequence; or displaying the error-corrected URLs according to an instruction of sequencing information of the error-corrected URLs.

8. A server, comprising:

a memory storing instructions; and a processor in communication with the memory, wherein, when the processor executes the instructions, the processor is configured to cause the server to:

determine, after receiving a URL from a terminal, whether a web page corresponding to the URL exists;

determine that when there is no web page corresponding to the URL, the URL is an incorrect URL;

perform similarity matching using the URL with URLs in a URL database, and acquire a pre-determined quantity of URLs most similar to the URL as error-corrected URLs;

send error-corrected URLs to the terminal;

in response to determining that the terminal is a mobile phone, determine whether a page at one of the error-corrected URLs has a corresponding page accessible for mobile phone terminals, the page at the one of the error-corrected URLs being accessible for personal computer terminals;

provide an additional option for a user of the terminal about whether to re-link the web page to the page corresponding to the mobile phone terminals;

receive, prior to the receiving the URL from the terminal, a character string from the terminal input by a user before the user completely input the URL into a URL bar of the terminal;

search a URL database using the character string as a keyword to acquire a plurality of URLs, sort the plurality of URLs from high to low based on access traffic of the plurality of URLs, and acquire a set quantity of URLs that are ranked top in the sorted plurality of URLs as alternative URLs, wherein the access traffic comprises at least one of: a quantity of unique users, a total quantity of users, a quantity of web pages browsed, a quantity of web pages browsed by each user, or an average dwell-time of a user; and send the alternative URLs to the terminal for selection by the user.

9. The server according to claim 8, wherein, when the processor executes the instructions, the processor is configured to further cause the server to:

acquire return status of the URL, determine whether the return status of the URL is an error page, and determine, that when the return status of the URL is an error page, there is no web page corresponding to the URL.

10. The server according to claim 8, wherein, when the processor executes the instructions, the processor is configured to further cause the server to:

acquire the terminal type of the terminal; and perform similarity matching by using the URL with a URL in a URL database that corresponds to the terminal type.

11. The server according to claim 8, wherein, when the processor executes the instructions, the processor is configured to further cause the server to:

acquire, when the quantity of error-corrected URLs is greater than or equal to two, access traffic of the error-corrected URLs; and send the access traffic of the error-corrected URLs to the terminal, or sort access traffic of the error-corrected URLs in a descending sequence and send sequencing information of the error-corrected URLs to the terminal.

12. A terminal, comprising:

a memory storing instructions; and a processor in communication with the memory, wherein, when the processor executes the instructions, the processor is configured to cause the terminal to:

receive a URL entered into a URL bar;

send the URL to a server;

receive, if there is no web page corresponding to the URL, error-corrected URLs from the server, the error-corrected URLs being a pre-determined quantity of URLs most similar to the URL that are obtained through performing similarity matching by using the URL with URLs in a URL database;

display received error-corrected URLs, wherein the server determines, in response to the terminal being a mobile phone, whether a page at one of the error-corrected URLs has a corresponding page accessible for mobile phone terminals, the page at the one of the error-corrected URLs being accessible for personal computer terminals;

provide an additional option for a user of the terminal about whether to re-link the web page to the page corresponding to the mobile phone terminals;

send, before a user completely input the URL into a URL bar of the terminal, a character string input by the user to the server, so that the server searches a URL database using the character string as a keyword to acquire a plurality of URLs, sorts the plurality of URLs from high to low based on access traffic of the plurality of URLs and acquires a set quantity of URLs that are ranked top in the sorted plurality of URLs as alternative URLs, wherein the access traffic comprises at least one of: a quantity of unique users, a total quantity of users, a quantity of web pages browsed, a quantity of web pages browsed by each user, or an average dwell-time of a user; and receive the alternative URLs from the server for selection by the user.

13. The terminal according to claim 12, wherein, when the processor executes the instructions, the processor is configured to further cause the terminal to:

receive a URL selected from the error-corrected URLS;

send a URL selected from the error-corrected URLs to a server; and receive web page data.

14. The terminal according to claim 12, wherein, when the processor executes the instructions, the processor is configured to further cause the terminal to:

receive, when the quantity of the error-corrected URLs is greater than or equal to two, access traffic of the error-corrected URLs sent by the server, or sequencing information of error-corrected URLs sent by the server, the sequencing information of error-corrected URLs carrying information on sorting access traffic of the error-corrected URLs in a descending sequence; and display the error-corrected URLs according to access traffic of the error-corrected URLs in a descending sequence, or display the error-corrected URLs according to an instruction of sequencing information of the error-corrected URLs.

* * * * *